US007868751B2

(12) United States Patent
Hoshina

(10) Patent No.: US 7,868,751 B2
(45) Date of Patent: Jan. 11, 2011

(54) CONTACT-FREE DATA COMMUNICATIONS SYSTEM, DATA COMMUNICATIONS DEVICE, CONTACT-FREE IDENTIFICATION TAG, PROGRAM FOR CONTROLLING THE CONTACT-FREE IDENTIFICATION TAG, AND PROGRAM FOR CONTROLLING THE DATA COMMUNICATIONS DEVICE

(75) Inventor: Masaki Hoshina, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 2106 days.

(21) Appl. No.: 10/773,561

(22) Filed: Feb. 6, 2004

(65) Prior Publication Data

US 2004/0203391 A1 Oct. 14, 2004

(30) Foreign Application Priority Data

Feb. 10, 2003 (JP) .............................. 2003-032541

(51) Int. Cl.
*G08B 1/08* (2006.01)
(52) U.S. Cl. ............................... 340/539.13; 340/572.1; 340/572.2; 340/572.3; 340/572.4; 340/572.6
(58) Field of Classification Search ............. 340/539.13
See application file for complete search history.

(56) References Cited

U.S. PATENT DOCUMENTS

| 6,710,776 | B2 | 3/2004 | Usaki | |
|---|---|---|---|---|
| 2003/0024975 | A1* | 2/2003 | Rajasekharan | ............... 235/375 |
| 2005/0122221 | A1* | 6/2005 | Chuang et al. | ............... 340/571 |

FOREIGN PATENT DOCUMENTS

| JP | 63035027 A | 2/1988 |
|---|---|---|
| JP | 03058524 A | 3/1991 |

(Continued)

OTHER PUBLICATIONS

Japanese language office action for corresponding Japanese patent application No. 2003-032541 lists the references above.

(Continued)

*Primary Examiner*—Davetta W Goins
*Assistant Examiner*—Ojiako Nwugo
(74) *Attorney, Agent, or Firm*—DLA Piper LLP (US)

(57) ABSTRACT

A contact-free data communication system includes a data communications device located in a predetermined place and a contact-free identification tag. The data communications device includes a first data controller and a data global positioning system that acquires positional information of the data communications device and a transmitter that transmits an electromagnetic wave for providing power and transmits the positional information of the data communications device to the contact-free identification tag in a surrounding area of the data communications device. The contact-free identification tag includes a receiver that receives positional information transmitted by the data communications device, a power generator that generates driving power out of the electromagnetic wave for providing power that is transmitted by the data communications device, a generator that generates positional relationship information based on the positional information that is received by the receiver, a display that displays positional relationship information that is generated by the generator, a data storage medium that is nonvolatile and a data storage that stores data in the storage medium.

8 Claims, 10 Drawing Sheets

FOREIGN PATENT DOCUMENTS

| | | |
|---|---|---|
| JP | 08235397 A | 9/1996 |
| JP | 10-068634 | 3/1998 |
| JP | 2001-116583 | 4/2001 |
| JP | 2001188608 A | 7/2001 |
| JP | 2002-117489 | 4/2002 |

OTHER PUBLICATIONS

Japanese language office action for corresponding Japanese patent application No. 2003-032541 lists the references above, Apr. 10, 2007.

* cited by examiner

CONTACT-FREE DATA COMMUNICATIONS SYSTEM, DATA COMMUNICATIONS DEVICE, CONTACT-FREE IDENTIFICATION TAG, PROGRAM FOR CONTROLLING THE CONTACT-FREE IDENTIFICATION TAG, AND PROGRAM FOR CONTROLLING THE DATA COMMUNICATIONS DEVICE

BACKGROUND OF THE INVENTION

1. Field of the Invention

The present invention relates to data communications by means of a contact-free identification (ID) tag having a display, and more particularly to a contact-free data communications system that is suitable for displaying information based on the positional information of a data communications device.

2. Description of Related Art

A guiding system using a contact-free ID tag has been designed to give directions in a building. To utilize such a system, a plurality of transmitters are placed in advance at predetermined positions in a building. Each of the transmitters stores information of its position. When a contact-free ID tag approaches the transmitter, the transmitter sends its positional information to the ID tag. On receiving the positional information, the contact-free ID tag sends the received information to management equipment having a display and a voice input device. The management equipment displays the positional information on the display, receives guiding messages from the voice input device, and outputs the messages from a speaker of the contact-free ID tag. This helps owners of the contact-free ID tag reach their destinations in the building by following voice guides without getting lost. This also enables building keepers to see where owners of the contact-free ID tag are in the building through information on the display.

A conventional guiding system, however, involves the following problems. Since owners of the contact-free ID tag rely only on voice guides from the speaker of the ID tag, they might go in the wrong direction when mishearing or misinterpreting the voice guides.

Also, since the conventional system gives directions by voice guides, it is not suited for people with impaired hearing, and not suited for noisy places crowded with people, such as in an amusement park. In addition, changing locations of the aforementioned transmitters and the like that send their own positional information to the contact-free ID tag requires time-consuming work, such as acquiring positional information of new locations and placing the transmitters at accurate positions.

In consideration of these problems, the invention aims to provide a contact-free data communications system that is suitable for giving directions in noisy places such as in an amusement park. The invention also aims to provide a data communications device that is easily located and gives positional information to a contact-free ID tag, the contact-free ID tag that includes a display on which information is displayed, and a control program that controls the entire system.

SUMMARY OF THE INVENTION

In order to meet the aims, a contact-free data communications system according to the invention includes a data communications device that is located in a predetermined place and a contact-free ID tag. The data communications device includes means for acquiring positional information that acquires positional information of the data communications device and means for transmitting data that transmits electromagnetic wave for providing power and transmits positional information of the data communications device that is acquired by the means for acquiring positional information to the contact-free ID tag that is in a surrounding area of the data communications device.

The contact-free ID tag includes means for receiving positional information that receives the positional information that is transmitted by the data communications device, means for generating power that generates driving power out of the electromagnetic wave for providing power that are transmitted by the data communications device, and means for generating positional relationship information that generates positional relationship information based on the positional information that is received by the means for receiving positional information. The contact-free ID tag also includes means for displaying positional relationship information that displays the positional relationship information that is generated by the means for generating positional relationship information, a data storage medium that is nonvolatile, and means for storing data that stores given data in the data storage medium.

In a first aspect of the invention, the contact-free data communications system with this configuration enables the following operations: on the part of the data communications device, acquiring positional information of the data communications device by the means for acquiring positional information, and transmitting electromagnetic wave for providing power and transmitting positional information of the data communications device, which is acquired by the means for acquiring positional information, to the contact-free ID tag that is in a surrounding area of the data communications device by the means for transmitting data. On the part of the contact-free ID tag, the system enables the following operations: receiving the positional information, which is transmitted by the data communications device, by the means for receiving positional information; generating driving power out of the electromagnetic wave for providing power, which are transmitted by the data communications device, by the means for generating power; generating positional relationship information based on the positional information, which is received by the means for receiving positional information, by the means for generating positional relationship information; displaying the positional relationship information, which is generated by the means for generating positional relationship information, by the means for displaying positional relationship information; and storing given data in the data storage medium that is nonvolatile by the means for storing data.

Accordingly, by locating the data communications device in an appropriate place, the means for acquiring positional information included in the device acquires the positional information of the device. This makes it easy to locate the data communications device and change its location. Meanwhile, the data communications device transmits its own positional information to the contact-free ID tag that is in its surrounding area. Upon receiving the positional information, the contact-free ID tag generates positional relationship information based on the positional information and displays the positional relationship information on its display such as a liquid crystal display. This enables a system user even in a noisy place to visibly see the positional relationship information including the user's present position.

The definition used here will now be given. Locating the data communications device in a predetermined place means that the data communications device is either fixed or placed in a portable manner. Acquiring positional information means that the present positional information of the data communications device is somehow acquired, for example, by measuring the present position using the global positioning system (GPS) or reading positional information stored in a memory etc.

The contact-free ID tag is used in a radio frequency identification (RFID) system and also called a data carrier in general. The tag can be in various shapes, such as a label, card, coin, and stick. The shape of the tag is determined depending on applications of the tag. For example, the tag can be a keychain-like card or label as a carry-along device. The tag can mainly be stick-shaped as a semiconductor carrier ID. It can mainly be coin-shaped for being sewn in linen goods.

The contact-free ID tag includes a read-only or read/write storage area. The contact-free ID tag of a certain type is also capable of performing operations without a battery by receiving power on its antenna through contact-free transmission. The RFID system is an ID system using electric and electromagnetic wave as carriers. The system enables the contact-free ID tag to (1) be portable in size, (2) store information in an electronic circuit, and (3) perform contact-free communications.

Therefore, the RFID system is used to integrate and share information with a person, object, automobile, etc. that has the contact-free ID tag. This means that necessary information is available to the person, object, or automobile, and new information is added as required. Typical examples of the RFID system include an electromagnetic coupling type, an electromagnetic induction type, a microwave type, and an optical type. The electromagnetic coupling type provides communications with the contact-free ID tag mainly by utilizing mutual induction of coils in an alternating magnetic field. The electromagnetic induction type provides communications with the contact-free ID tag mainly by utilizing electromagnetic wave at a frequency of 250 kHz or below or at low- and medium-frequency of 13.56 MHz. The microwave type provides communications between a reader/writer antenna and the contact-free ID tag by utilizing microwaves at a frequency of 2.45 GHz. The optical type provides communications with the contact-free ID tag by utilizing optical transmission from an LED as an optical source to a phototransistor as a receiving element.

Major access modes are the following: a single access mode, a first-in-first-out (FIFO) access mode, a multi-access mode, and a selective access mode. The single access mode provides communications with only one contact-free ID tag within an antenna communications range. A plurality of contact-free ID tags in the range result in an error in this mode, which means no communications will be established.

The FIFO access mode provides communications with one contact-free ID tag after another coming in an antenna communications range in a first-in-first-out manner. The contact-free ID tag that has completed communications is kept in an access denied status. Therefore, it is possible to provide communications with another tag coming in the range, even if there are a plurality of tags that completed communications remaining in the range. A plurality of contact-free ID tags coming in the area at a time result in a communications error, which means no communications will be established. The access denied status is removed once the contact-free ID tag of the state gets out of the communications range.

The multi-access mode provides communications with all contact-free ID tags in an antenna communications range when there are a plurality of tags. The selective access mode provides communications with specific contact-free ID tags out of a plurality of contact-free ID tags within a communications rage. What makes it possible is two commands: one allocates the number to contact-free ID tags within the range, and the other performs communications with specific contact-free ID tags based on the allocated number.

The means for acquiring positional information detects positional changes of the data communication device, as the GPS does. The data storage medium that is nonvolatile means that the medium retains storage content even after being powered off, as a flash memory does. In a second aspect of the invention, the contact-free data communications system of the first aspect further includes means for inputting destination information that inputs destination information to the contact-free ID tag. Also, the means for generating positional relationship information generates the positional relationship information based on the positional information that is transmitted by the data communications device and the destination information that is input by the means for inputting destination information.

As the means for inputting destination information inputs the destination information to the contact-free ID tag, the means for generating positional relationship information generates the positional relationship information based on what is acquired by the means for acquiring positional information and the destination information. This makes it possible for a system user even in a noisy place to visibly see information showing the positional relationship between the data communications device and the user's destination by setting the destination.

In a third aspect of the invention, a contact-free data communications system includes a data communications device that is located in a predetermined place, a contact-free ID tag, and means for inputting destination information that inputs destination information to the contact-free ID tag. The data communications device includes means for acquiring positional information that acquires positional information of the data communications device, means for receiving destination information that receives the destination information that is input to the contact-free ID tag, means for generating positional relationship information that generates positional relationship information that shows positional relationship between the contact-free ID tag and the destination based on the destination information and the positional information of the data communications device, and means for transmitting data that transmits an electromagnetic wave for providing power and transmits the positional relationship information that is generated by the means for generating positional relationship information to the contact-free ID tag that is in a surrounding area of the data communications device.

The contact-free ID tag includes means for transmitting destination information that transmits the destination information to the data communications device, means for generating power that generates driving power out of the electromagnetic wave for providing power that are transmitted by the data communications device, means for receiving positional relationship information that receives the positional relationship information, means for displaying positional relationship information that displays the positional relationship information that is received by the means for receiving positional relationship information, a data storage medium that is nonvolatile, and means for storing data that stores given data in the data storage medium.

In the present aspect, the means for inputting destination information inputs destination information to the contact-free ID tag. In addition, the contact-free data communications system according to this aspect enables the following operations: on the part of the data communications device, acquiring positional information of the data communications device by the means for acquiring positional information; and receiving the destination information, which is input to the contact-free ID tag in a surrounding area of the data communications device, by the means for receiving destination information. The data communications device is also designated for generating positional relationship information that shows positional relationship between the contact-free ID tag and the destination based on the destination information and the positional information of the data communications device by the means for generating positional relationship information; and transmitting electromagnetic wave for providing power and transmitting the positional relationship information, which is generated by the means for generating positional relationship information, to the contact-free ID tag in a surrounding area of the data communications device, by the means for transmitting data.

On the part of the contact-free ID tag, the system enables the following operations: transmitting the destination information to the data communications device by the means for transmitting destination information; generating driving power out of the electromagnetic wave for providing power, which are transmitted by the data communications device, by the means for generating power, receiving the positional relationship information by the means for receiving positional relationship information; displaying the positional relationship information, which is received by the means for receiving positional relationship information, by the means for displaying positional relationship information; and storing given data in the data storage medium that is nonvolatile by the means for storing data.

Accordingly, by locating the data communications device in an appropriate place, the means for acquiring positional information included in the device acquires the positional information of the device. Thus there is no need for time-consuming work including acquiring the positional information and inputting the information to the data communications device. This makes it easy to locate the data communications device and change its location. Meanwhile, the data communications device receives designation information that is input to the contact-free ID tag in its surrounding area. Based on the designation information and its own positional information, the data communications device generates positional relationship information and transmits the positional relationship information to the contact-free ID tag. Then the contact-free ID tag displays the positional relationship information. This enables a system user even in a noisy place to visibly see the positional relationship between the user's present position and destination.

In a fourth aspect of the invention, the contact-free data communications system according to any one of the first to third aspects includes the data communications device further including means for displaying positional information that displays information showing the position of the data communications device based on the positional information of the data communications device that is acquired by the means for acquiring positional information. In the present aspect, the means for displaying positional information of the data communications device displays information showing the position of the data communications device based on the positional information of the data communications device that is acquired by the means for acquiring positional information.

This makes it possible to determine the position of the data communications device, while visually confirming its present positional information, and thereby makes it easy to locate the data communications device. In a fifth aspect of the invention, the contact-free ID tag is that of the first aspect. The contact-free ID tag includes the means for receiving positional information that receives the positional information that is transmitted by the data communications device, the means for generating power that generates driving power out of the electromagnetic wave for providing power that are transmitted by the data communications device, and the means for generating positional relationship information that generates positional relationship information based on the positional information that is received by the means for receiving positional information. The contact-free ID tag also includes the means for displaying positional relationship information that displays the positional relationship information that is generated by the means for generating positional relationship information, the data storage medium that is nonvolatile, and the means for storing data that stores given data in the data storage medium.

As the contact-free ID tag of the present aspect is the same as the contact-free ID tag of the first aspect, the description of its operations is omitted here. In a sixth aspect of the invention, the means for generating positional relationship information according to the fifth aspect generates the positional relationship information based on the positional information that is transmitted by the data communications device and destination information that was stored to the data storage medium previously.

As the contact-free ID tag of the present aspect is the same as the contact-free ID tag of the second aspect, the description of its operations is omitted here. In a seventh aspect of the invention, the contact-free ID tag is that of the third aspect. The contact-free ID tag includes the means for transmitting destination information that transmits the destination information to the data communications device, the means for receiving positional relationship information that receives the positional relationship information that is transmitted by the data communications device, and the means for generating power that generates driving power out of the electromagnetic wave for providing power that are transmitted by the data communications device. The contact-free ID tag also includes the means for displaying positional relationship information that displays the positional relationship information that is received by the means for receiving positional relationship information, the data storage medium that is nonvolatile, and the means for storing data that stores given data in the data storage medium.

As the contact-free ID tag of the present aspect is the same as the contact-free ID tag of the third aspect, the description of its operations is omitted here. In an eighth aspect of the invention, the data communications device is that of the first aspect. The data communications device includes the means for acquiring positional information that acquires positional information of the data communications device, and the means for transmitting data that transmits electromagnetic wave for providing power and transmits positional information of the data communications device that is acquired by the means for acquiring positional information to the contact-free ID tag that is in a surrounding area of the data communications device.

As the data communications device of the present aspect is the same as the data communications device of the first aspect, the description of its operations is omitted here. In a ninth aspect of the invention, the data communications device is that of the third aspect. The data communications device includes the means for acquiring positional information that acquires positional information of the data communications device, the means for receiving destination information that receives the destination information that is input to the contact-free ID tag, the means for generating positional relationship information that generates positional relationship information that shows positional relationship between the contact-free ID tag and the destination based on the destination information and the positional information of the data communications device, and the means for transmitting data that transmits electromagnetic wave for providing power and transmits the positional relationship information that is generated by the means for generating positional relationship information to the contact-free ID tag that is in a surrounding area of the data communications device.

As the data communications device of the present aspect is the same as the data communications device of the third aspect, the description of its operations is omitted here. In a tenth aspect of the invention, the data communications device according to the eighth or ninth aspect further includes the means for displaying positional information that displays information that shows the position of the data communications device based on the positional information of the data communications device that is acquired by the means for acquiring positional information.

As the data communications device of the present aspect is the same as the data communications device of the fourth aspect, the description of its operations is omitted here. In an eleventh aspect of the invention, a program for controlling operations of the contact-free ID tag according to the fifth aspect includes the following steps: receiving positional information that receives the positional information that is transmitted by the data communications device, generating power that generates driving power out of the electromagnetic wave for providing power that are transmitted by the data communications device, generating positional relationship information that generates positional relationship information based on the positional information that is received in the step of receiving positional information, displaying positional relationship information that displays the positional relationship information that is generated in the step of generating positional relationship information, and storing data that stores given data in the data storage medium that is nonvolatile.

As the program of the present aspect is to control the contact-free ID tag according to the fifth aspect, the description of its operations is omitted here. In a twelfth aspect of the invention, the step of generating positional relationship information according to the eleventh aspect generates the positional relationship information based on the positional information that is transmitted by the data communications device and destination information that was stored to the data storage medium previously.

As the program of the present aspect is to control the contact-free ID tag according to the sixth aspect, the description of its operations is omitted here. In a thirteenth aspect of the invention, a program for controlling operations of the contact-free ID tag according to the seventh aspect includes the following steps: transmitting destination information that transmits the destination information to the data communications device, receiving positional relationship information that receives the positional relationship information that is transmitted by the data communications device, generating power that generates driving power out of the electromagnetic wave for providing power that are transmitted by the data communications device, displaying positional relationship information that displays the positional relationship information that is received in the step of receiving positional relationship information, and storing data that stores given data in the data storage medium that is nonvolatile.

As the program of the present aspect is to control the contact-free ID tag according to the seventh aspect, the description of its operations is omitted here. In a fourteenth aspect of the invention, a program for controlling operations of the data communications device according to the eighth aspect includes the following steps: acquiring positional information that acquires positional information of the data communications device, and transmitting data that transmits electromagnetic wave for providing power and transmits positional information of the data communications device that is acquired in the step of acquiring positional information to the contact-free ID tag that is in a surrounding area of the data communications device.

As the program of the present aspect is to control the data communications device according to the eighth aspect, the description of its operations is omitted here. In a fifteenth aspect of the invention, a program for controlling operations of the data communications device according to the ninth aspect includes the following steps: acquiring positional information that acquires positional information of the data communications device, receiving destination information that receives destination information that is input to the contact-free ID tag, generating positional relationship information that generates positional relationship information that shows positional relationship between the contact-free ID tag and the destination based on the destination information and the positional information of the data communications device, and transmitting data that transmits electromagnetic wave for providing power and transmits positional relationship information that is generated in the step of generating positional relationship information to the contact-free ID tag that is in a surrounding area of the data communications device.

As the program of the present aspect is to control the data communications device according to the ninth aspect, the description of its operations is omitted here.

In addition, the invention can be applied to the following modes.

(1) As for the contact-free data communications system according to any one of the second to fourth aspects, the positional relationship information is an estimated distance between the data communications device and a destination that is input by the means for inputting designation information.

(2) As for the contact-free data communications system according to any one of the second to fourth aspects and the preceding clause (1), the positional relationship information is estimated time that is required for a system user to reach the destination in a given way from the location of the data communications device that is acquired by the means for acquiring positional information.

(3) As for the contact-free data communications system according to any one of the second to fourth aspects and the preceding clauses (1) and (2), the positional relationship information is information showing a direction toward the destination from the location of the contact-free ID tag.

(4) As for the contact-free ID tag according to the sixth or seventh aspects, the positional relationship information is estimated time that is required for a system user to reach the destination in a given way from the location of the data communications device that is acquired by the means for acquiring positional information.

(5) As for the contact-free ID tag according to the sixth or seventh aspects and the preceding clause (4), the positional relationship information is information showing a direction toward the destination from the location of the contact-free ID tag.

(6) As for the contact-free ID tag according to any one of the fifth to seventh aspects and the preceding clauses (4) and (5), the means for displaying positional information includes an electrophoretic display.

(7) As for the data communications device according to the ninth aspect, the positional relationship information is an estimated distance between the data communications device and a destination that is input by the means for inputting designation information.

(8) As for the data communications device according to the ninth aspect and the preceding clause (7), the positional relationship information is estimated time that is required for a system user to reach the destination in a given way from the location of the data communications device that is acquired by the means for acquiring positional information.

(9) As for the data communications device according to the ninth aspect and the preceding clauses (7) and (8), the positional relationship information is information showing a direction toward the destination from the location of the contact-free ID tag.

(10) The program for controlling operations of the data communications device according to the fourteenth or fifteenth aspect further includes the step of displaying positional information that displays information showing the position of the data communications device based on the positional information of the data communications device that is acquired in the step of acquiring positional information.

DETAILED DESCRIPTION OF THE PREFERRED EMBODIMENTS

Figure 1:
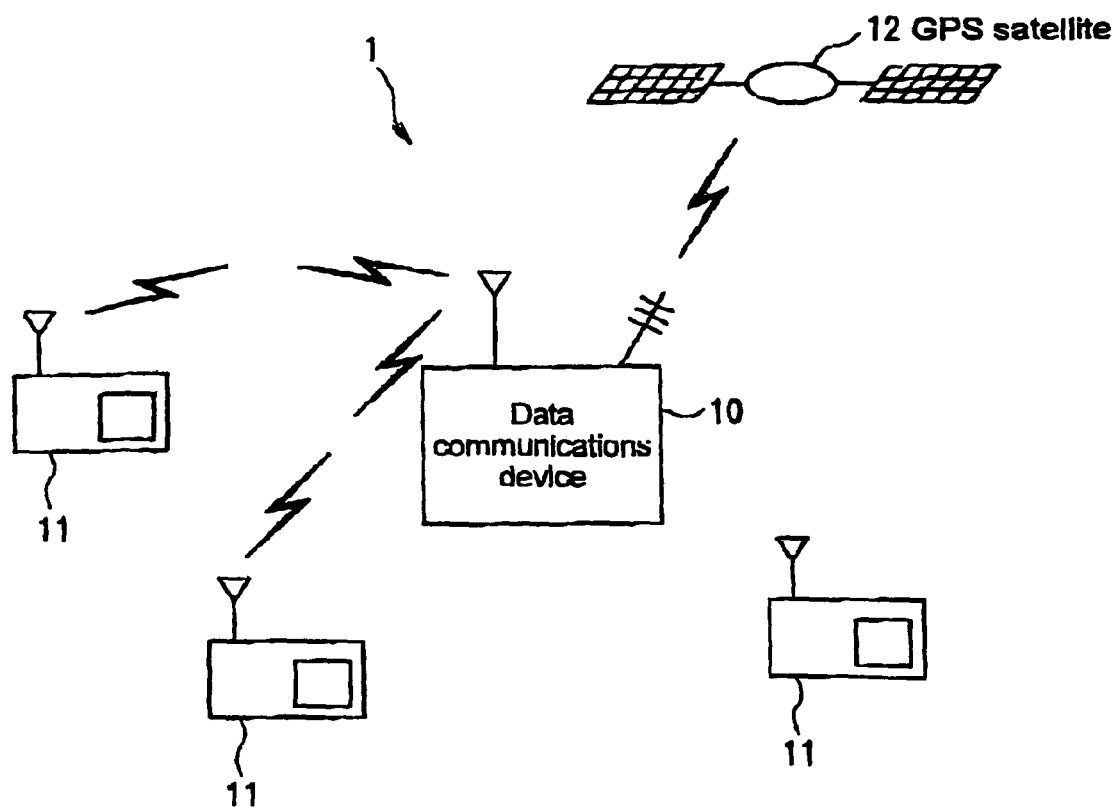
FIG. 1 shows the overall structure of a guiding system according to the invention.

Embodiments of the invention will now be described with reference to the accompanying drawings. FIGS. 1 through 10 are diagrams showing a guiding system using a contact-free data communications system according to the invention. Referring to FIG. 1, the overall structure of the guiding system according to the invention will be described. FIG. 1 shows the overall structure of the guiding system according to the invention.

As shown in FIG. 1, a guiding system 1 includes a data communications device 10, a contact-free ID tag 11 including a plurality of contact-free ID tags, and a global positioning system (GPS) satellite 12. The data communications device 10 performs a data communications function by means of electromagnetic induction that communicates with the contact-free ID tag 11 (that is described in greater detail below) utilizing low- and medium-frequency electromagnetic waves. The data communications device 10 also includes a GPS 10c to acquire its own positional information. The GPS satellite 12 communicates with the GPS 10c and acquires the positional information of the data communications device 10.

Figure 2:
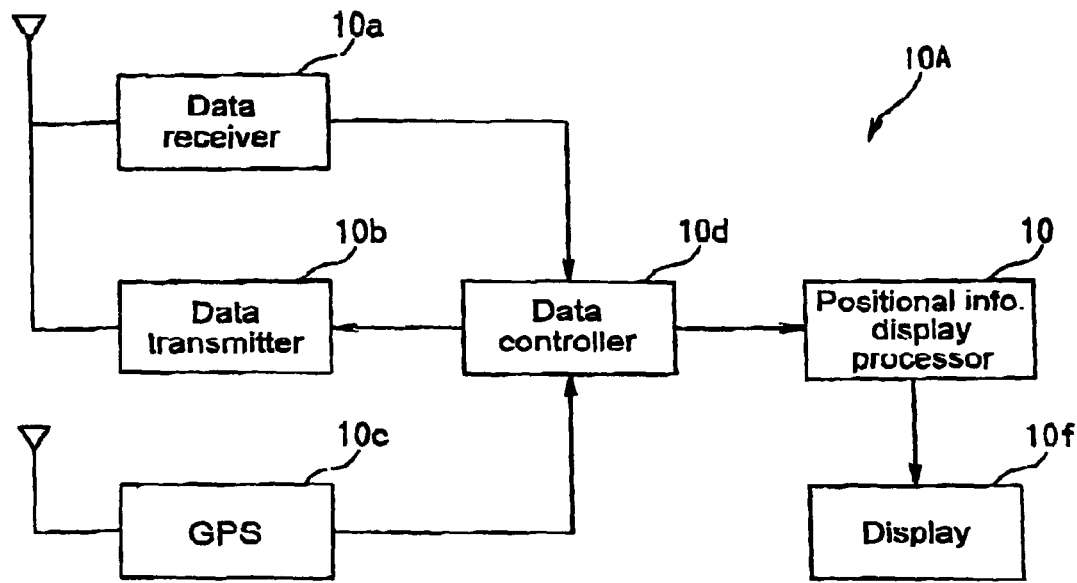
FIG. 2 is a block diagram showing the configuration of a first data communications device.

Referring to FIG. 2, the configuration of a first data communications device will now be described. FIG. 2 is a block diagram showing the configuration of the first data communications device. As shown in FIG. 2, a first data communications device 10A includes a data receiver 10a, a data transmitter 10b, the GPS 10c, a data controller 10d, a positional information display processor 10e, and a display 10f.

The data receiver 10a receives data from the contact-free ID tag by means of electromagnetic induction. The data transmitter 10b transmits data to the contact-free ID tag by means of electromagnetic induction. The GPS 10c acquires the positional information of the data communications device 10A from the GPS satellite 12.

The data controller 10d controls data communications processing by means of electromagnetic induction carried out by the data receiver 10a and the data transmitter 10b, such as data communications from and to the contact-free ID tag. The positional information display processor 10e processes the positional information of the data communications device 10A, which is acquired by the GPS 10c, so as to display the information on the display (that is described in greater detail below) in a way that users of the system can see the information visually, for example, by displaying images.

Figure 3:
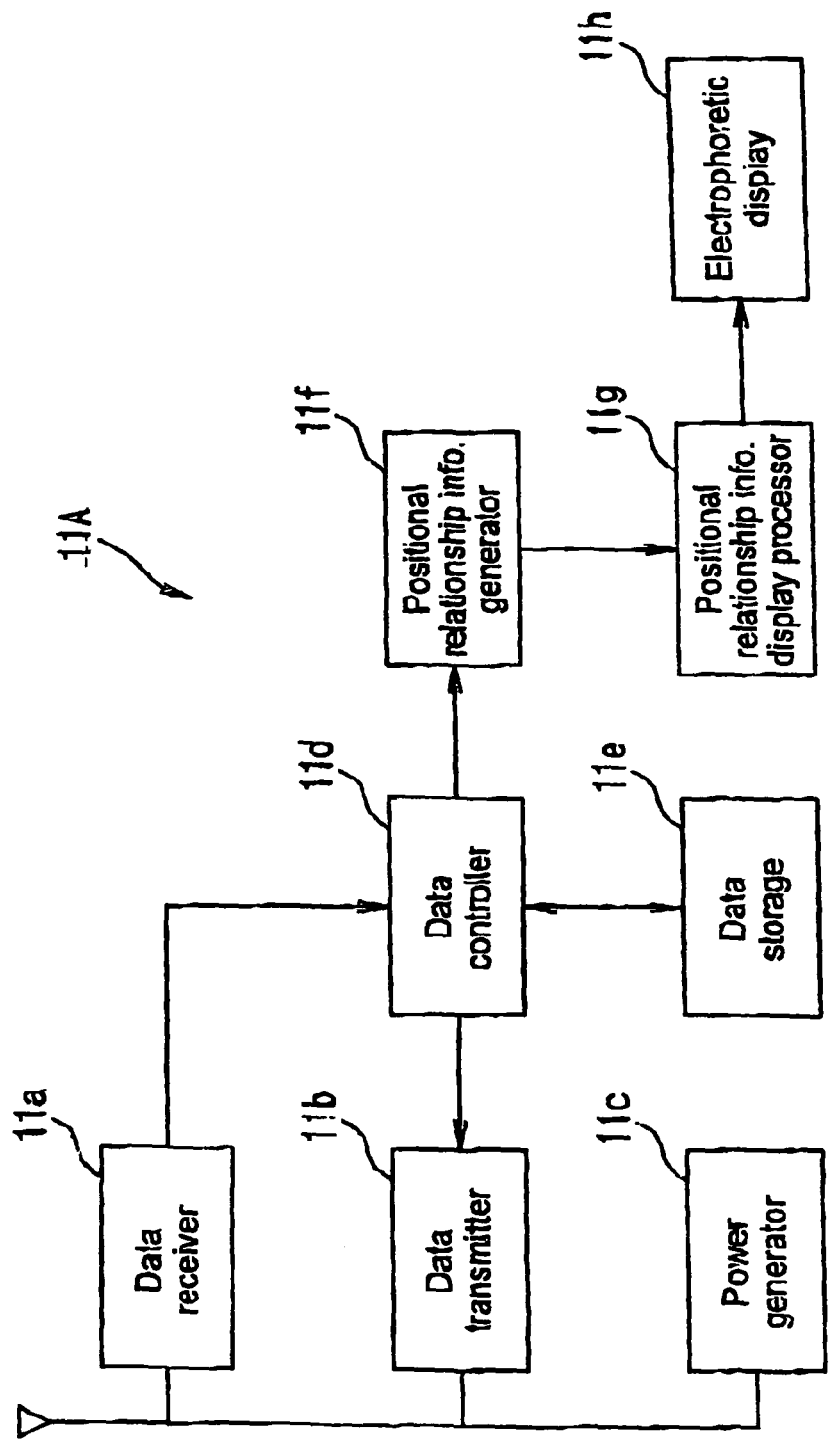
FIG. 3 is a block diagram showing the configuration of a first contact-free ID tag.

The display 10f is controlled by the positional information display processor 10e. Examples of the display 10f include cathode-ray tube displays and liquid crystal displays. Referring to FIG. 3, the configuration of a first contact-free ID tag will now be described. FIG. 3 is a block diagram showing the configuration of the first contact-free ID tag. As shown in FIG. 3, a first contact-free ID tag 11A includes a data receiver 11a, a data transmitter 11b, a power generator 11c, a data controller 11d, a data storage 11e, a positional relationship information generator 11f, a positional relationship information display processor 11g, and an electrophoretic display 11h.

The data receiver 11a, by means of electromagnetic induction, receives data transmitted from the first data communications device 10A without direct contact. The data transmitter 11b, by means of electromagnetic induction, transmits given stored data such as unique ID information stored in the data storage 11e to the first data communications device 10A.

The power generator 11c receives carrier waves from the first data communications device 10A, generates power from the waves, and provides itself (the first contact-free ID tag) with the power. The data controller 11d controls data communications with the first data communications device 10A by means of electromagnetic induction carried out by the data receiver 11a and the data transmitter 11b.

The data storage 11e stores specific data such as positional information transmitted by the first data communications device 10A. The positional relationship information generator 11f, based on destination information stored in the data storage 11e and positional information transmitted by the first data communications device 10A, generates positional relationship information that is derived from the positional relationship between the first data communications device 10A and a destination. Examples of such information include the following: a distance between the first data communications device 10A and the destination, an estimated time required to reach the destination from the first data communications device 10A, and a direction toward the destination from the first data communications device 10A.

The positional relationship information display processor 11g displays the positional information generated by the positional relationship information generator 11f on the electrophoretic display 11h by visual means such as characters and images. The electrophoretic display 11h is a display utilizing electrophoretic mobility. Here, electrophoretic mobility means a phenomenon of particles that are naturally charged during dispersion (to be electrophoretic particles), migrating by the Coulomb force when applying an electrical field to a liquid medium in which the particles are dispersed (a dispersion liquid). This electrophoretic display performs a function of retaining displayed images (hereinafter called "image retention"). This means that the display is able to retain images that are once displayed by applying an electrical field.

The operations of the guiding system using the first data communications device 10A and the first contact-free ID tag 11A will now be described in detail. Here, the description is given with an example of being guided in an amusement park with the system.

Each system user is provided with the first contact-free ID tag 11A that stores positional information of an attraction in the park that is the user's destination. The first contact-free ID tag here may include a plurality of contact-free ID tags each storing positional information of each one of the attractions in the park. Moreover, specially-designed equipment (not shown in the drawings) may be used in the park to write positional information of a designated attraction to the tag.

The first data communications device 10A is installed in each and every part in the amusement park. The data communications device 10A sends a response request command that requires to send a response to the first contact-free ID tag 11A at predetermined time intervals.

Consequently, when a system user with the first contact-free ID tag 11A comes within a communications area of the first data communications device 10A (for example, within a three-meter radius of the first data communications device 10A), the first contact-free ID tag 11A receives the response request command. More specifically, the response request command is received by the data receiver 11a of the first contact-free ID tag 11A and then analyzed by the data controller 11d. If the data controller 11d analyzes it as a response request command, the unique ID information stored in the data storage 11e is sent as response data to the first data communications device 10A via the data transmitter 11b. Here, carrier waves that send the response request command also provide the first contact-free ID tag 11A with power. The power generator 11c of the first contact-free ID tag 11A generates power from the received waves and then provides each operating part of the first contact-free ID tag 11A with the power.

On the part of the first data communications device 10A, the data receiver 10a receives the response data from the first contact-free ID tag 11A. Subsequently, the data controller 10d analyzes the response data, and the GPS 10c acquires the positional information of the first data communications device 10A based on the ID information included in the response data. Then the data transmitter 10b sends the positional information to the first contact-free ID tag 11A corresponding to the ID information.

Then, on the part of the first contact-free ID tag 11A, the data receiver 11a receives the positional information from the first data communications device 10A. Based on the positional information and information on a designated attraction's location that is stored in the data storage 11e, a distance from the first data communications device 10A to the designated attraction is calculated.

According to this embodiment, the positional information of the first data communications device 10A and each attraction in the park consists of latitude and longitude information. Therefore, on the part of the first contact-free ID tag 11A, the positional relationship information generator 11f, based on the positional information of the first data communications device 10A and each attraction, calculates a distance between the two and a direction toward the designated attraction from the first data communications device 10A.

Then, the positional relationship information generator 11f generates image information so as to display the calculated distance and directional information, and sends the information to the positional relationship information display processor 11g. Then, the positional relationship information display processor 11g performs processing so as to display the received image information on the electrophoretic display 11h.

Furthermore, in this embodiment, the positional relationship information generator 11f, based on the calculated distance between the first data communications device 10A and the designated attraction and preset walking speed information, estimates the time required to reach the attraction. The positional relationship information display processor 11g performs processing to display the estimated time, as well as the distance and directional information, as image information on the electrophoretic display 11h.

Figure 7:
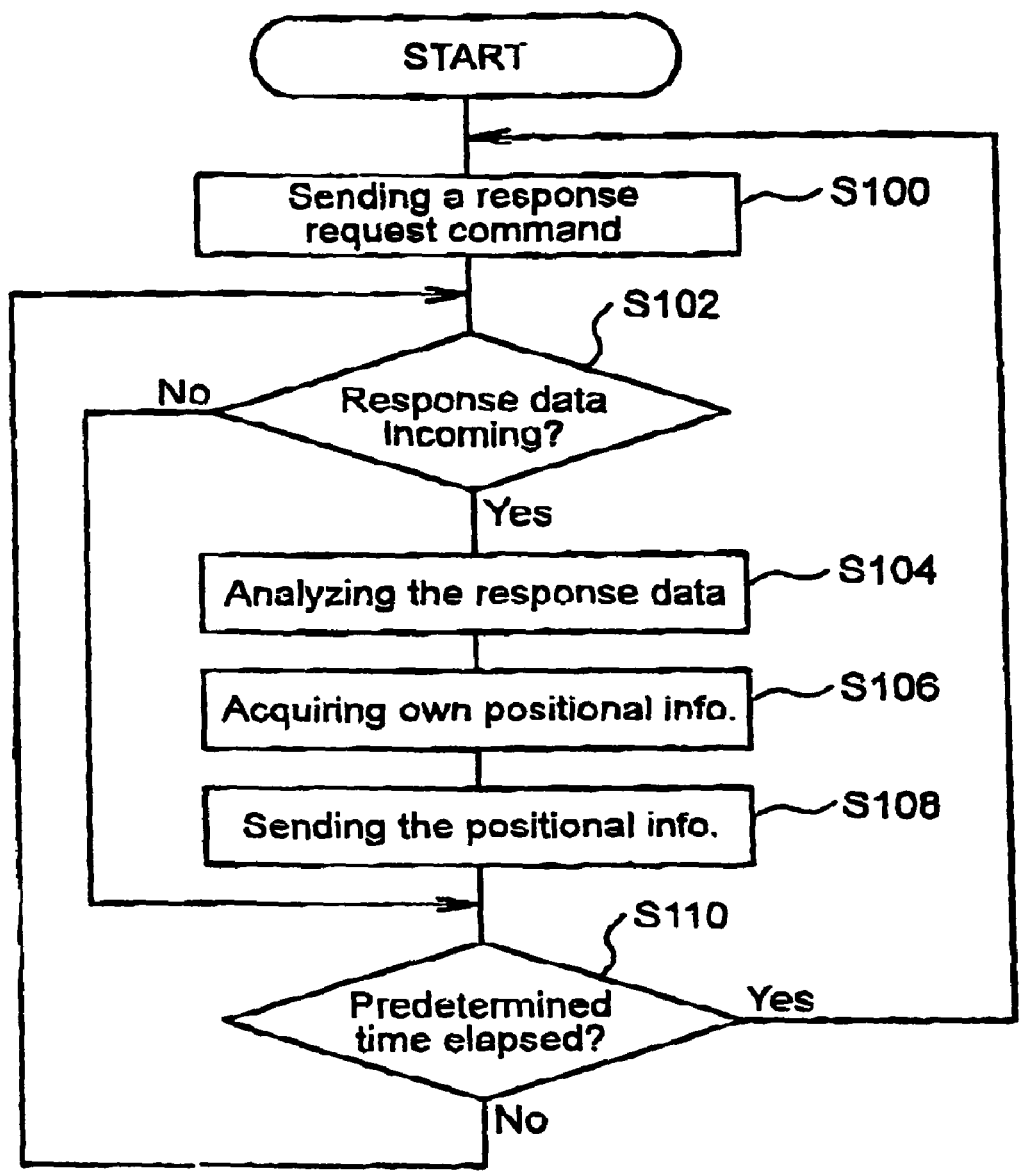
FIG. 7 is a flow chart showing the flow of the operation of the first data communications device 10A.

Referring to FIG. 7, the flow of the operation of the first data communications device 10A will now be described. FIG. 7 is a flow chart showing the flow of the operation of the first data communications device 10A. As shown in FIG. 7, the operation starts of a step S100. The data controller 10d sends a response request command via the data transmitter 10b, which carries the process forward to step S102.

In this embodiment, the response request command is sent not to a specific contact-free ID tag but to contact-free ID tags randomly in a surrounding area. In addition, multi-access communications make it possible to communicate with the first contact-free ID tag 11A here including a plurality of contact-free ID tags simultaneously.

At step S102, the data receiver 10a judges whether there are response data incoming from the first contact-free ID tag 11A in a surrounding area. If the data receiver 10a finds the response data received (Yes), the process moves on to step S104. If not (No), the process moves on to step S110. At step S104, the data controller 10d analyzes the received response data and extracts ID information from the data. Then the process moves on to step S106. At step S106, the GPS 10c acquires the positional information of the data communications device 10A, which carries the process forward to step S108. At step S108, the data controller 10d sends the acquired positional information to the first contact-free ID tag 11A corresponding to the extracted ID information via the data transmitter 10b. Then the process moves on to step S110.

At step S110, whether a predetermined period of time elapses or not is determined. If "Yes", the process moves on to step S100. If "No", the process moves on to step S102. In the meanwhile, if the process moves on to step S110 without receiving the response data in step S102, whether a predetermined period of time elapses after sending the response request command is judged. If "Yes", the process moves on to step S100. If "No", the process moves on to step S102. In other words, if no response is received from the first contact-free ID tag 11A, the process starting from step S102 is repeated until a predetermined period of time elapses.

Figure 8:
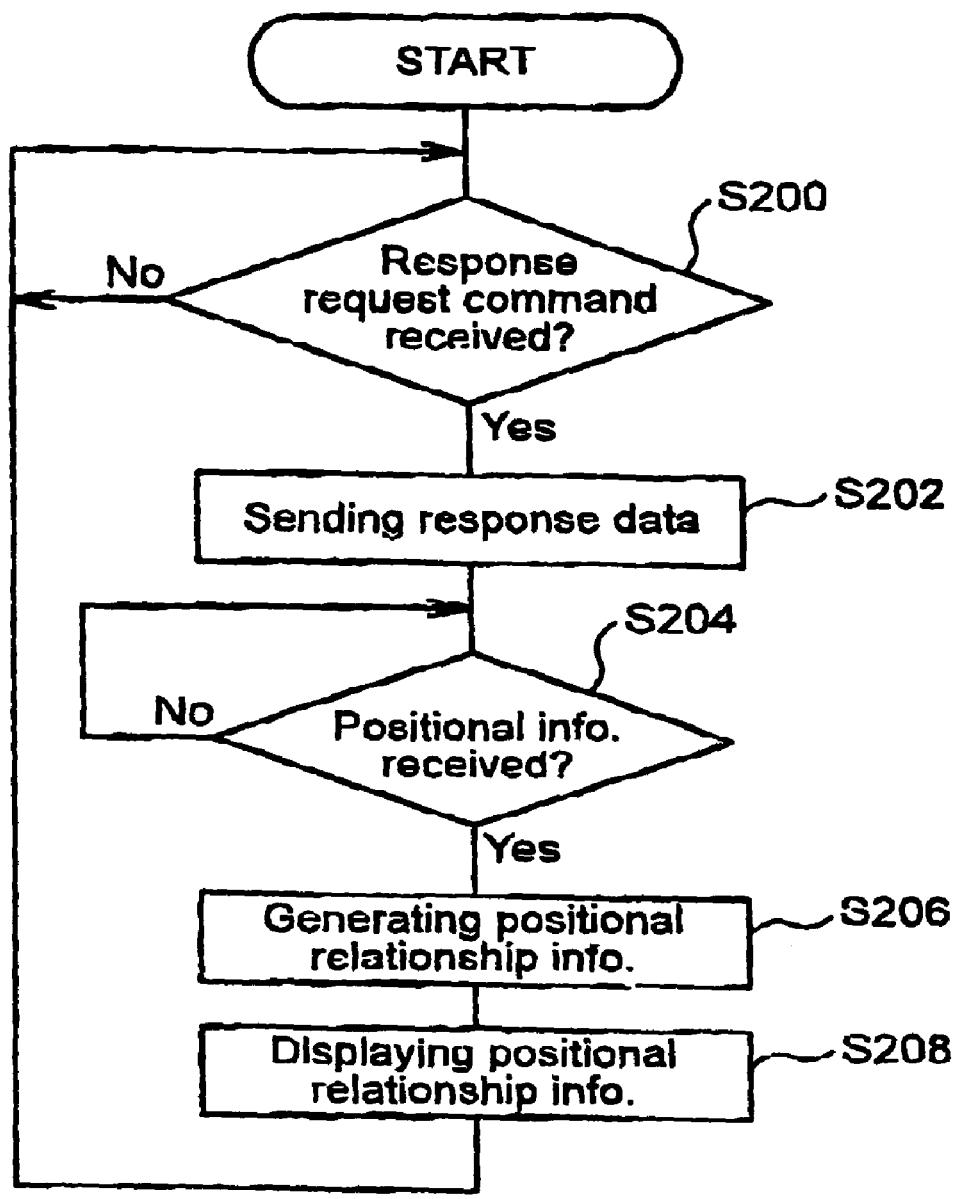
FIG. 8 is a flow chart showing the flow of the operation of the first contact-free ID tag 11A.

If a predetermined period of time elapses at step S110, which carries the process forward to step S100, the response request command is again sent to a surrounding area. Then the process moves on to step S102. Referring now to FIG. 8, the flow of the operation of the first contact-free ID tag 11A will be described. FIG. 8 is a flow chart showing the flow of the operation of the first contact-free ID tag 11A.

As shown in FIG. 8, the process starts with step S200. The data receiver 11a judges whether a response request command is received from the first data communications device 10A. If the data receiver 11a finds the command received (Yes), the process moves on to step S202. If not (No), the process is suspended until the command is received. At step S202, the data controller 11d sends response data including the ID information of the first contact-free ID tag 11A to the first data communications device 10A via the data transmitter 11b. Then the process moves on to step S204.

At step S204, the data receiver 11a judges whether positional information is received from the first data communications device 10A. If the data receiver 11a finds the information received (Yes), the process moves on to a step S206. If not (No), the process is suspended until the information is received. At step S206, the positional relationship information generator 11f generates positional relationship information based on destination information stored in the data storage 11e and the received positional information. Then the process moves on to step S208.

In this embodiment, the positional relationship information generator 11f generates positional relationship information including an estimated distance from the first data communications device and a destination, an estimated time required to reach the destination from the first data communications device, a direction toward the destination from the first data communications device, and so forth. The positional relationship information is calculated based on latitude and longitude information used as positional information and a known formula, such as Gauss's average latitude calculation, Hubeny's distance calculation, and spherical trigonometry.

At step S208, the positional relationship information display processor 11g performs processing to display the positional relationship information generated by the positional relationship information generator 11f on the electrophoretic display 11h. Then the process moves on to step S200. Here, the calculated distance and estimated time are displayed in figures, while the directional information is shown with characters (e.g. north, south, east, and west) and with arrows.

According to this embodiment, when steps S202 through S208 are being carried out upon receiving a response request command, another incoming response request command is neglected until the steps have been completed. As mentioned above, by only passing nearby the first data communications device 10A that is located in an amusement park with the first contact-free ID tag 11A, a system user can visually see positional relationship information, such as a distance and required time from the first data communications device 10A to the user's designated attraction, and a direction toward the designated attraction from the first data communications device 10A on the electrophoretic display of the first contact-free ID tag 11A. Therefore, the system shows positional relationship information such as an approximate distance from a present position to a destination, a required time to reach the destination, and a direction toward the destination.

Figure 4:
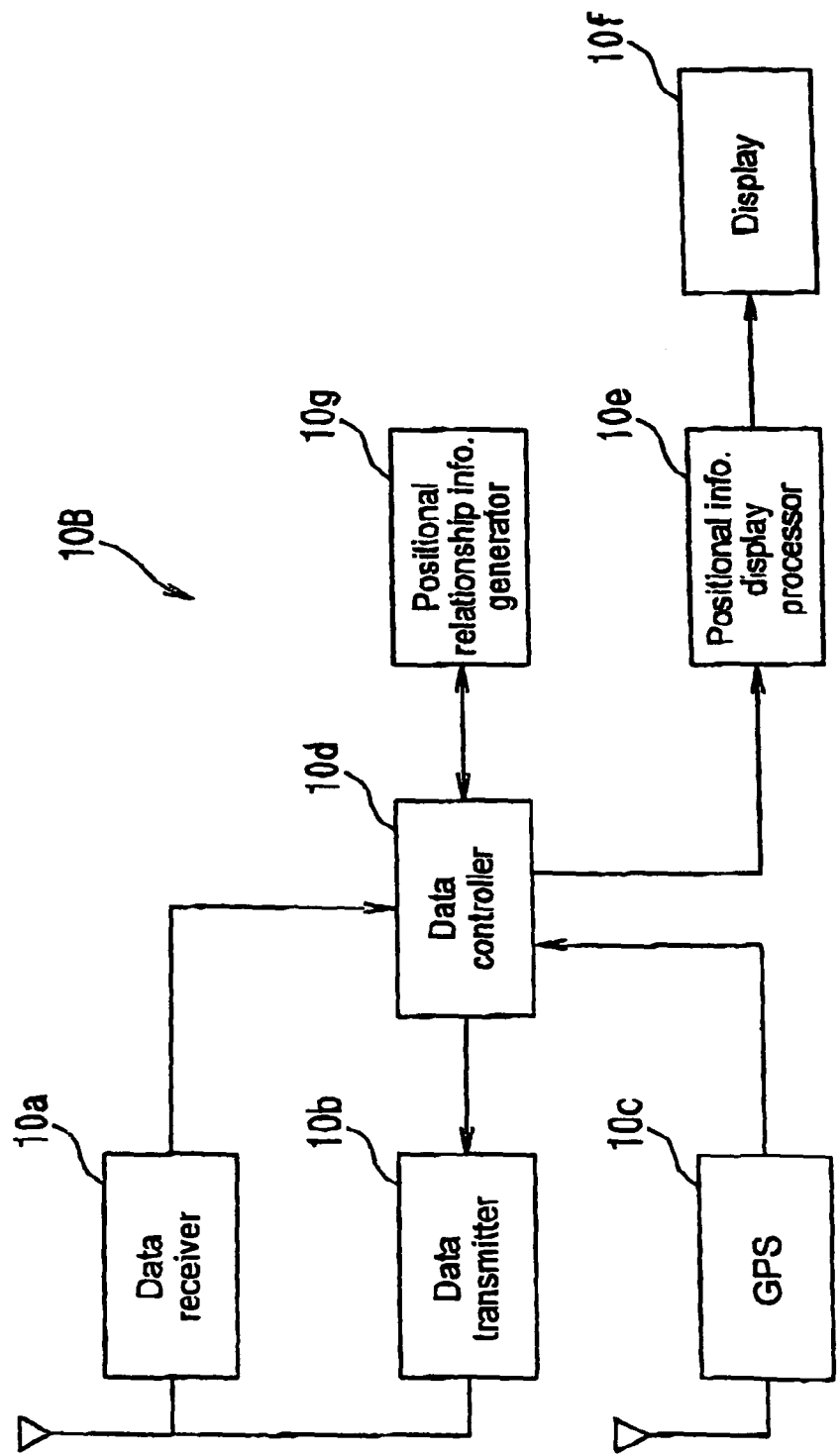
FIG. 4 is a block diagram showing the configuration of a second data communications device.
Figure 5:
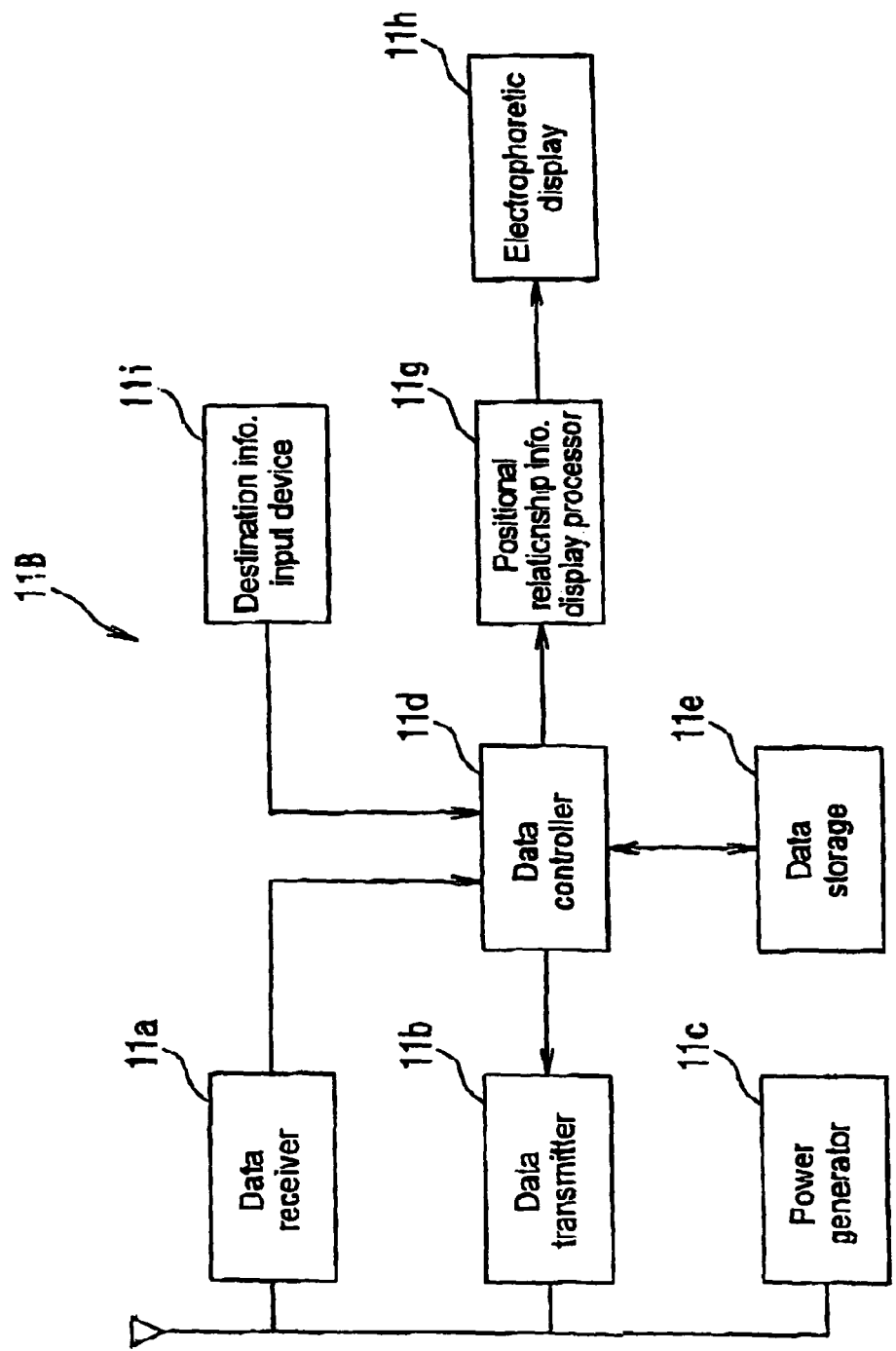
FIG. 5 is a block diagram showing the configuration of a second contact-free ID tag.

The configuration of a second data communications device 10B and a second contact-free ID tag 11B and the detailed operations of a guiding system using the two will now be described with reference to FIGS. 4 and 5. FIG. 4 shows the configuration of the second data communications device, while FIG. 5 shows the configuration of the second contact-free ID tag. Here, the elements of the two that are the same as those of the first data communications device 10A and the first contact-free ID tag 11A are indicated with same numerals and their description will be omitted.

As shown in FIG. 4, the second data communications device 10B includes the data receiver 10a, the data transmitter 10b, the GPS 10c, the data controller 10d, the positional information display processor 10e, the display 10f, and a positional relationship information generator 10g. The positional relationship information generator 10g, based on destination information received from the second contact-free ID tag 11B and positional information transmitted by the second data communications device 10B, generates positional relationship information that is derived from the positional relationship between the second data communications device 10B and a destination. Examples of such information include the following: a distance between the second data communications device 10B and the destination, an estimated time required to reach the destination from the second data communications device 10B, and a direction toward the destination from the second data communications device 10B.

Referring now to FIG. 5, the configuration of the second contact-free ID tag 11B will be described. As shown in FIG. 5, the second contact-free ID tag 11B includes the data receiver 11a, the data transmitter 11b, the power generator 11c, the data controller 11d, the data storage 11e, the positional relationship information display processor 11g, the electrophoretic display 11h, and a destination information input device 11i.

The destination information input device 11i is used to set a destination and enables a system user to set a destination by him/herself. Destination information can be set by, for example, inputting the latitude and longitude information of the user's destination with a dial, buttons, or a numeric keypad.

The operations of the guiding system using the second data communications device 10B and the second contact-free ID tag 11B will now be described in detail. Here, the description is given with an example of being guided in an amusement park with the system. Each of the system users is provided with the second contact-free ID tag 11B and an attraction park map showing the latitude and longitude information of each attraction in the park.

The positional information of the user's destination is set with the information shown in the map by means of the destination information input device 11i. According to this embodiment, an example is shown where a system user inputs the latitude and longitude information of the user's destination shown in the map with the numeric keypad of the second contact-free ID tag 11B. The second data communications device 10B is installed in each and every part in the park. The second data communications device 10B sends a response request command that requires to send a response to the second contact-free ID tag 11B at predetermined time intervals.

Consequently, when a system user with the second contact-free ID tag 11B comes within a communications area of the second data communications device 10B (for example, within a three-meter radius of the second data communications device 10B), the second contact-free ID tag 11B receives the response request command. More specifically, the response request command is received by the data receiver 11a of the second contact-free ID tag 11B and then analyzed by the data controller 11d. If the data controller 11d analyzes it as a response request command, unique ID information and the positional information of a designated attraction stored in the data storage 11e are sent as response data to the second data communications device 10B via the data transmitter 11b.

Here, the carrier that sends the response request command also provides the second contact-free ID tag 11B with power. The power generator 11c of the second contact-free ID tag 11B generates power from the received waves and then provides each operating part of the second contact-free ID tag 11B with the power. Meanwhile, on the part of the second data communications device 10B, the data receiver 10a receives the response data from the second contact-free ID tag 11B, and the data controller 11d analyzes the response data. Then ID information and the positional information of the designated attraction that are included in the response data are extracted. Consequently, based on the positional information of the second data communications device 10B acquired by the GPS 10c and the extracted positional information of the designated attraction, a distance from the second data communications device 10B to the designated attraction and a direction toward the designated attraction from the second data communications device 10B are calculated.

According to this embodiment, as is the case with the first data communications device 10A, the positional information of the second data communications device 10B and each attraction in the park consists of latitude and longitude information. Therefore, in the second data communications device 10B, the positional relationship information generator 10g, based on the positional information of the second data communications device 10B and each attraction, calculates a distance between the two and a direction toward the designated attraction from the second data communications device 10B. Based on the extracted ID information, the distance and directional information is transmitted to the second contact-free ID tag 11B corresponding to the ID information via the data transmitter 10b.

On the part of the second contact-free ID tag 11B upon receiving the distance information, the positional relationship information display processor 11g generates information in order to display the distance information with characters and to display the directional information with arrows. Then the positional relationship information display processor 11g performs processing to display-the information on the electrophoretic display 11h. Furthermore, in this embodiment, the positional relationship information generator 10g of the second data communications device 10B, based on the calculated distance between the second data communications device 10B and the designated attraction and preset walking speed information, estimates the time required to reach the attraction. The positional relationship information display processor 11g performs processing to display the estimated time, as well as the distance information, on the electrophoretic display 11h with characters.

Alternatively, the latitude and longitude information of each attraction may be stored in the data storage of the contact-free ID tag. In this case, when selecting an attraction from an attraction list shown on the display of the contact-free ID tag, the latitude and longitude information of the selected attraction stored in the data storage is set as destination information.

Figure 9:
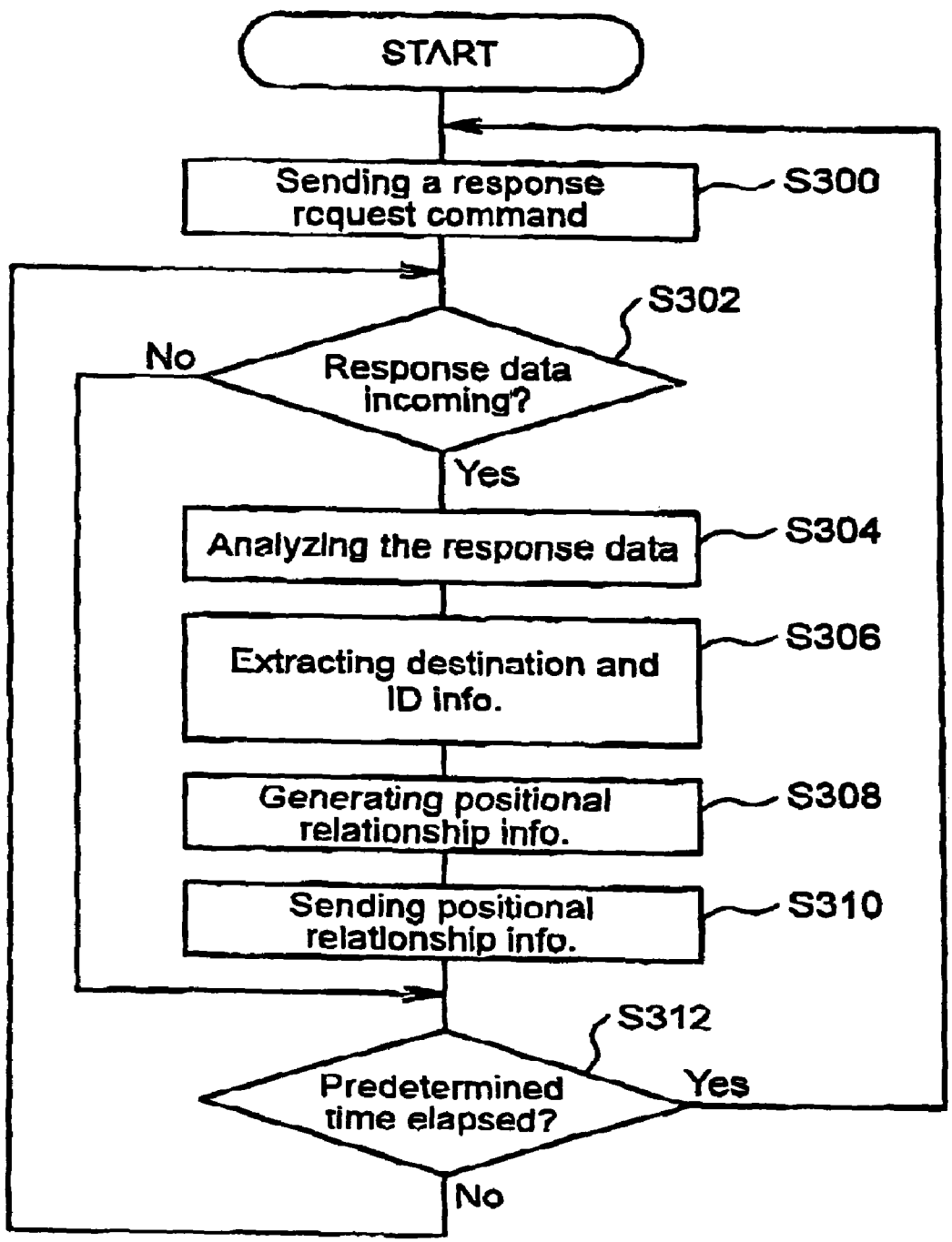
FIG. 9 is a flow chart showing the flow of the operation of the second data communications device 10B.

Referring to FIG. 9, the flow of the operation of the second data communications device 10B will now be described. FIG. 9 is a flow chart showing the flow of the operation of the second data communications device 10B. As shown in FIG. 9, the operation start at step S300. The data controller 10d sends a response request command via the data transmitter 10b, which carries the process forward to step S302.

In this embodiment, the response request command is sent not to a specific contact-free ID tag but to contact-free ID tags randomly in a surrounding area. In addition, multi-access communications make it possible to communicate with the second contact-free ID tag 11B here including a plurality of contact-free ID tags simultaneously.

At step S302, the data receiver 10a judges whether there are response data incoming from the second contact-free ID tag 11B in a surrounding area. If the data receiver 10a finds the response data received (Yes), the process moves on to step S304. If not (No), the process moves on to step S312. At step S304, the data controller 10d analyzes the received response data. Then the process moves on to step S306.

At step S306, ID information and destination information are extracted from the analyzed response data. Then the process moves on to step S308. Ate step S308, the GPS 10c acquires the positional information of the second data communications device 10B. Then the positional relationship information generator 10g generates positional relationship information based on the extracted destination information and the acquired positional information of the second data communications device 10B, which carries the process forward to step S310.

At step S310, the data controller 10d sends the generated positional relationship information to the second contact-free ID tag 11B corresponding to the ID information extracted in step S306 via the data transmitter 10b. Then the process moves on to step S312. At step S312, whether a predetermined period of time elapses or not is judged after sending the response request command. If "Yes", the process moves on to step S300. If "No", the process moves on to step S302. In other words, if no response is received from the second contact-free ID tag 11B, the process starting from step S302 is repeated until a predetermined period of time elapses.

Figure 10:
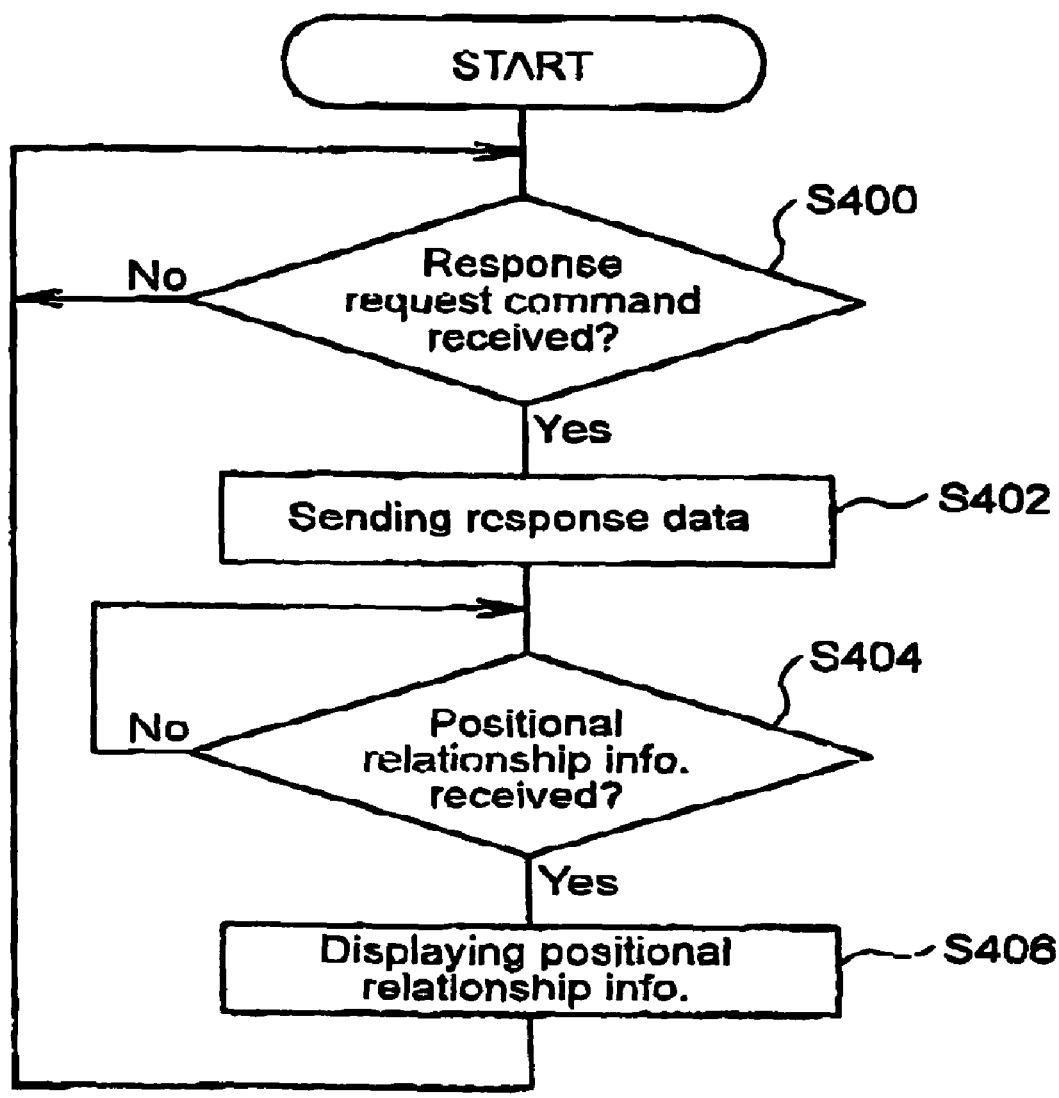
FIG. 10 is a flow chart showing the flow of the operation of the second contact-free ID tag 11B.

If a predetermined period of time elapses in step S312, which carries the process forward to step S300, the response request command is again sent to a surrounding area. Then the process moves on to step S302. Referring now to FIG. 10, the flow of the operation of the second contact-free ID tag 11B will be described. FIG. 10 is a flow chart showing the flow of the operations of the second contact-free ID tag 11B.

As shown in FIG. 10, the process starts with step S400. The data receiver 11a judges whether a response request command is received from the second data communications device 10B. If the data receiver 11a finds the command received (Yes), the process moves on to step S402. If not (No), the process is suspended until the command is received. At step S402, the data controller 11d sends response data including the ID information of the second contact-free ID tag 11B and destination information to the second data communications device 10B via the data transmitter 11b. Then the process moves on to step S404.

At step S404, the data receiver 11a judges whether positional relationship information is received from the second data communications device 10B. If the data receiver 11a finds the information received (Yes), the process moves on to step S406. If not (No), the process is suspended until the information is received. At step S406, the positional relationship information display processor 11g performs processing to display the positional relationship information transmitted from the second data communications device 10B on the electrophoretic display 11h. Then the process moves on to step S400. Here, the calculated distance and estimated time are displayed in figures, while the directional information is shown with characters (e.g. north, south, east, and west) and with arrows.

According to this embodiment, when steps S402 through S406 are being carried out upon receiving a response request command, another incoming response request command is neglected until the steps are completed. As mentioned above, by only passing nearby the second data communications device 10B that is located in an amusement park with the second contact-free ID tag 11B, a system user can visually see a distance and required time from the second data communications device 10B to the user's designated attraction, and a direction toward the designated attraction from the second data communications device 10B. Therefore, the system shows an approximate distance from a present position to a destination, a required time to reach the destination, and a direction toward the destination.

Some examples of displaying an arrow indicating a direction toward a designated attraction from a present position as positional relationship information on the electrophoretic display will now be described. As a first example, the data communications device that is located in an amusement park is provided with a portion in which the contact-free ID tag is placed in a predetermined direction. The positional relationship information generator of the data communications device generates arrow information showing a direction toward a designated attraction and sends the information to the contact-free ID tag. Thus, an image with an arrow towards the designated attraction from the data communications device is displayed on the electrophoretic display of the contact-free ID tag.

As a second example, the arrow information mentioned in the first example may be generated on the part of the contact-free ID tag. In this case, the data communications device only sends positional information (latitude and longitude information) to the contact-free ID tag. Based on the received positional information and the positional information of the designated attraction, the positional relationship information generator of the contact-free ID tag calculates the direction. Then the positional relationship information display processor performs processing to display an image with an arrow indicating the direction toward the designated attraction on the electrophoretic display.

Figure 6:
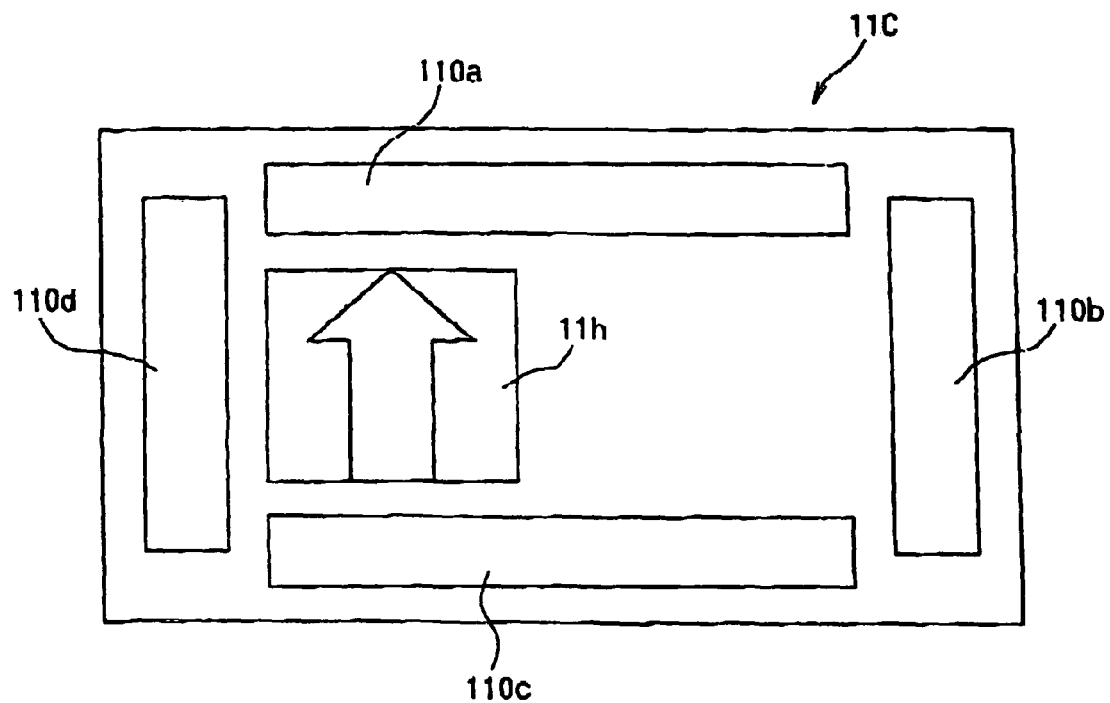
FIG. 6 is a diagram showing a third contact-free ID tag 11C that is a card-type tag.

A third example is provided in order to improve usability, while the arrow information is valid only when the contact-free ID tag is correctly placed in the predetermined portion in the above-mentioned first and second examples. In other words, information shown with an arrow is invalid when the direction of the contact-free ID tag changes according to the above-mentioned examples. In the third example, as shown in FIG. 6, a third contact-free ID tag 11C that is a card-type tag is used. An antenna is provided on each of the four sides of the third contact-free ID tag 11C. The strength of electric waves received by each antenna is used to judge a direction toward the data communication device. For example, if electric waves received by an antenna 110a are stronger than those received by any other antennas 110b to 110d, the data communication device is deemed to be in the direction of the antenna 110a. If both the antennas 110a and 110d receive the strongest electric waves, the data communication device is deemed to be in an oblique direction.

Thus, even if the direction of the contact-free ID tag toward the data communications device is changed, the direction can be detected, and thereby an arrow displayed on the electrophoretic display is corrected to show a direction toward a designated attraction even when the direction of the contact-free ID tag is changed. Here, the acquisition of positional information by the GPS 10c and the data controller 10d shown in FIG. 2 corresponds to the means for acquiring positional information shown in the first, fourth, eighth, and tenth aspects of the invention. The transmission of the positional information by the data transmitter 10b and the data controller 10d shown in FIG. 2 corresponds to the means for transmitting data shown in the first and eighth aspects of the invention. The reception of positional information by the data receiver 11a and the data controller 11d shown in FIG. 3 corresponds to the means for receiving positional information shown in the first and fifth aspects of the invention. The positional relationship information generator 11f shown in FIG. 3 corresponds to the means for generating positional relationship information shown in the first, second, fifth, and sixth aspects of the invention.

The positional relationship information display processor 11g and the electrophoretic display 11h shown in FIG. 3 correspond to the means for displaying positional relationship information shown in the first and fifth aspects of the invention. The data storage 11e shown in FIG. 3 corresponds to the means for storing data shown in the first and fifth aspects of the invention. The acquisition of positional information by the GPS 10c and the data controller 10d shown in FIG. 4 corresponds to the means for acquiring positional information shown in the third, fourth, ninth, and tenth aspects of the invention. The reception of destination information by the data receiver 10a and the data controller 10d shown in FIG. 4 corresponds to the means for receiving destination information shown in the third and ninth aspects of the invention.

The transmission of the positional information by the data transmitter 10b and the data controller 10d shown in FIG. 4 corresponds to the means for transmitting data shown in the third and ninth aspects of the invention. The reception of positional relationship information by the data receiver 11a and the data controller 11d shown in FIG. 5 corresponds to the means for receiving positional relationship information shown in the third and seventh aspects of the invention. The transmission of the destination information by the data transmitter 11b and the data controller 11d shown in FIG. 5 corresponds to the means for transmitting destination information shown in the third and seventh aspects of the invention.

The data storage 11e shown in FIG. 5 corresponds to the means for storing data shown in the third and seventh aspects of the invention. The positional relationship information display processor 11g and the electrophoretic display 11h shown in FIG. 5 correspond to the means for displaying positional relationship information shown in the third and seventh aspects of the invention.

In the above-mentioned embodiment, the positional relationship information includes a distance between the data communication device and a destination, an estimated time required to reach the destination from the data communication device, and a direction toward the destination from the data communication device. The positional relationship information is not limited to those, and may include any information that is derived from positional relationship between the two. As an application of the system, for example, the positional information of chain stores (e.g. restaurants) may be stored in the contact-free ID tag so as to display information on one of the stores that is the nearest to the present position of a owner of the tag on its display.

Also in this embodiment, the data communications device sends a response request command and waits for receiving a response from the contact-free ID tag before sending its own positional information to the contact-free ID tag. Instead of this, the data communications device may unilaterally send its own positional information to contact-free ID tags within its communications area.

What is claimed is:

1. A contact-free data communications system comprising:
a data communications device located in a predetermined place; and
a contact-free identification tag;
the data communications device comprising:
a positional information acquiring circuit acquiring positional information between the data communications device and a destination; and
a data transmitter transmitting an electromagnetic wave for providing power and transmitting the positional information of the data communications device acquired by the positional information acquiring circuit to the contact-free identification tag in a surrounding area of the data communications device;
the contact-free identification tag comprising:
a positional information receiving circuit receiving positional information transmitted by the data communications device;
a power generator generating driving power out of the electromagnetic wave for providing power that is transmitted by the data communications device;
a positional relationship information generator based on the positional information that is received by the positional information receiving circuit;
a display displaying positional relationship information generated by the means for generating positional relationship information;
a data storage medium that is nonvolatile for storing data in the data storage medium;
a destination information input device to the contact-free identification tag, wherein
the positional relationship information generator generates the positional relationship information based on the positional information transmitted by the data communications device and the destination information input by the destination information input device.

2. The contact-free data communications system according to claim 1, wherein the display displays positional information showing a position of the data communications device based on the positional information of the data communications device acquired by the positional information acquiring circuit.

3. A contact-free data communications system, comprising:
a data communications device located in a predetermined place;
a contact-free identification tag; and
a destination information input device to the contact-free identification tag;
the data communications device comprising:
a positional information acquiring circuit acquiring of the data communications device;
a destination information input device receiving destination information to the contact-free identification tag;
a positional relationship information generator that shows a positional relationship between the contact-free identification tag and a destination based on the destination information and the positional information of the data communications device; and
a data transmitter transmitting an electromagnetic wave for providing power and transmitting the positional relationship information that is generated by the positional relationship information generator to the contact-free identification tag that is in a surrounding area of the data communications device;

the contact-free identification tag comprising:
a destination information transmitter transmitting to the data communications device;
a power generator driving power out of the electromagnetic wave for providing power that is transmitted by the data communications device;
a positional relationship information receiver;
a display displaying positional relationship information received by the positional relationship information receiver;
a data storage medium that is nonvolatile for storing data in the data storage medium.

4. The contact-free data communications system according to claim 3, further comprising a display displaying positional information showing a position of the data communications device based on the positional information of the data communications device acquired by the positional information acquiring circuit.

5. A contact-free data communications system comprising:
a data communications device located in a predetermined place; and
a contact-free identification tag;
the data communications device comprising:
a positional information acquiring circuit acquiring positional information between the data communications device and a destination; and
a data transmitter transmitting an electromagnetic wave for providing power and transmitting the positional information of the data communications device acquired by the positional information acquiring circuit to the contact-free identification tag in a surrounding area of the data communications device;
the contact-free identification tag comprising:
a positional information receiving circuit receiving positional information transmitted by the data communications device;
a power generator generating driving power out of the electromagnetic wave for providing power that is transmitted by the data communications device;
a positional relationship information generator based on the positional information that is received by the positional information receiving circuit;
a display displaying positional relationship information generated by the means for generating positional relationship information;
a data storage medium that is nonvolatile for storing data in the data storage medium;
a display showing a position of the data communications device based on the positional information of the data communications device acquired by the positional information acquiring circuit.

6. A contact-free identification tag comprising:
a positional information receiver receiving positional information transmitted by a data communications device;
a power generator generating driving power out of an electromagnetic wave for providing power transmitted by the data communications device;
a positional relationship information generator generating positional relationship information based on the positional information received by the positional information receiver;
a display displaying positional relationship information generated by the positional relationship information generator; and
a data storage medium that is nonvolatile for storing data in the data storage medium, wherein the positional relationship information generator generates the positional relationship information based on the positional information that is transmitted by the data communications device and destination information that was stored to the data storage medium previously.

7. A data communications device comprising:
a positional information acquiring circuit acquiring positional information of a data communications device;
a destination information receiving device that is input to a contact-free identification tag;
a positional relationship information generator that shows a positional relationship between the contact-free identification tag and a destination based on the destination information and the positional information of the data communications device;
a data transmitter that transmits an electromagnetic wave for providing power and transmitting the positional relationship information that is generated by the positional relationship information generator to the contact-free identification tag in a surrounding area of the data communications device; and
a display displaying positional information that shows a position of the data communications device based on the positional information of the data communications device that is acquired by the positional information acquiring circuit.

8. A contact-free data communication system comprising:
a data communications device located in a predetermined place; and
a contact-free identification tag;
the data communications device comprising;
a first data controller and a data global positioning system that acquires positional information of the data communications device and a destination; and
a transmitter that transmits an electromagnetic wave for providing power and transmits the positional information of the data communications device to the contact-free identification tag in a surrounding area of the data communications device;
the contact-free identification tag comprising:
a receiver that receives positional information transmitted by the data communications device;
a power generator that generates driving power out of the electromagnetic wave for providing power that is transmitted by the data communications device;
a generator that generates positional relationship information based on the positional information that is received by the receiver;
a display that displays positional relationship information that is generated by the generator;
a data storage medium that is nonvolatile;
a data storage that stores data in the storage medium; and
an input device that is used to input destination information to the contact-free identification tag.

* * * * *